United States Patent

Ulfhielm

[15] 3,641,872
[45] Feb. 15, 1972

[54] PRODUCING A CURVED SURFACE WITH NUMERICALLY CONTROLLED MACHINE TOOL

[72] Inventor: Christer Ulfhielm, Saab Aktiebolag, Linkoping, Sweden

[22] Filed: Dec. 15, 1969

[21] Appl. No.: 884,782

[52] U.S. Cl. ............................................90/13 C, 90/11 C
[51] Int. Cl. ..........................................................B23c 1/16
[58] Field of Search.............................90/13 C, 13 R, 11 C; 51/165.71

[56] References Cited

UNITED STATES PATENTS

| | | | |
|---|---|---|---|
| 2,837,707 | 6/1958 | Stokes | 90/13 C X |
| 2,677,311 | 5/1954 | Campbell | 90/13 R X |

FOREIGN PATENTS OR APPLICATIONS

| | | | |
|---|---|---|---|
| 521,011 | 3/1955 | Italy | 90/13 R |
| 897,723 | 6/1944 | France | 90/13 R |

*Primary Examiner*—Gil Weidenfeld
*Attorney*—Ira Milton Jones

[57] ABSTRACT

For machining a surface having compound curvature by means of a numerically controlled machine tool, a rotary cutting or grinding tool is used. It has a convex working surface that has the same circular profile on any radial plane through the tool's rotational axis, which profile, on every such plane, has the same radius $r$ about a center which has the same location relative to the tool axis. Machining is planned in terms of an imaginary reference surface which is at $r$ distance from the desired surface as measured along outward normals to the desired surface at every point thereon. Said center in the tool is maintained in coincidence with the reference surface during machining. Various methods of determining the reference surface are disclosed.

3 Claims, 7 Drawing Figures

PATENTED FEB 15 1972
3,641,872
SHEET 1 OF 4
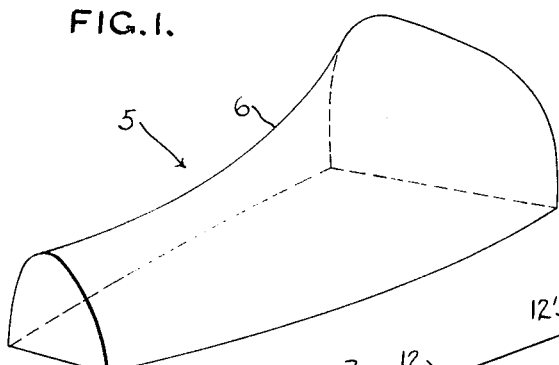
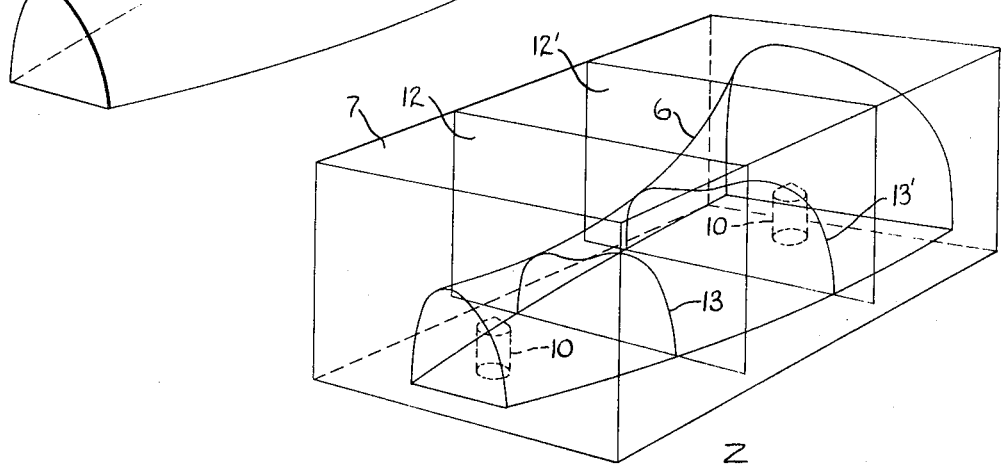
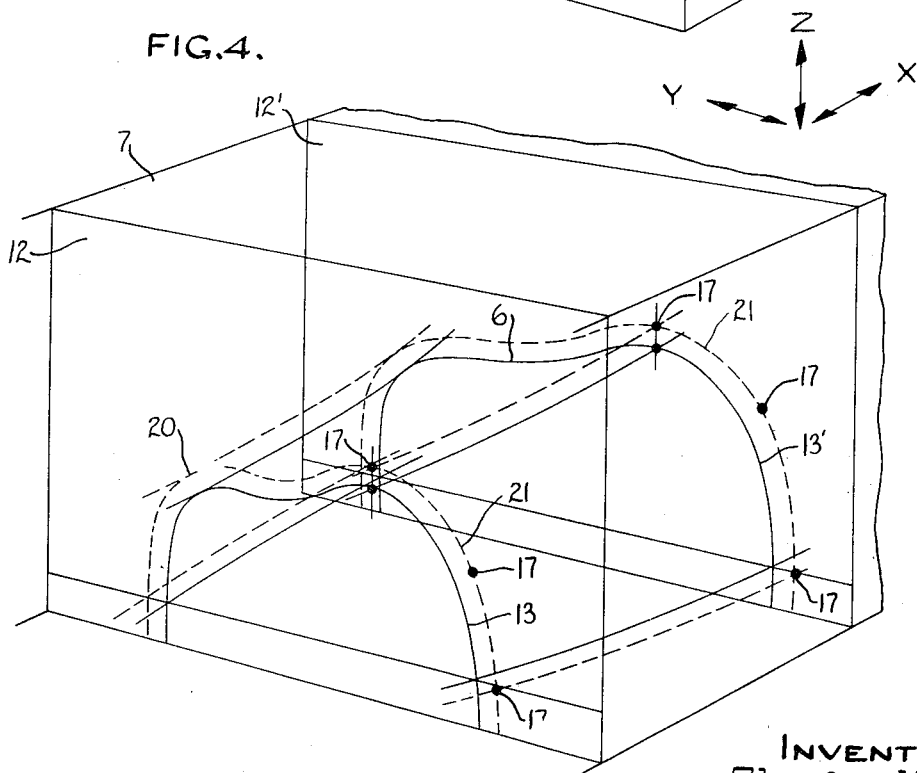
INVENTOR
Christer Ulfhielm
BY
ATTORNEY

PATENTED FEB 15 1972

INVENTOR
Christer Ulfhielm
BY
ATTORNEY

PRODUCING A CURVED SURFACE WITH NUMERICALLY CONTROLLED MACHINE TOOL

This invention relates to the shaping of a workpiece by means of an automatically controlled machine to produce on the workpiece a desired surface configuration having a compound curvature and which configuration may be other than a surface of revolution; and the invention is concerned more specifically with the shaping of such a workpiece by means of a numerically controlled machine which effects such relative motion between a rotary tool and a workpiece that the axis of rotation of the tool always has the same orientation.

The use of a copy milling machine has been the expedient most frequently heretofore used for the production on a workpiece of a surface having compound curvature, where the desired surface is not one of revolution that can be formed by means of a lathe or a similar machine that rotates the workpiece. However, copy milling has substantial disadvantages, one of which is the need for producing a physical model of the desired part, which model must be traced in the production of the actual finished part. The making of the model is obviously time consuming and can be very expensive, especially if the model is to be used for only a short production run. Copy milling also lacks the flexibility that is usually required to make possible an automatic operation which is adapted to its purpose and profitable.

At first impression it might seem that numerically controlled machine would be readily adaptable to use in producing a desired surface on a workpiece, especially if the surface to be formed is one that can be defined in terms of a mathematical expression or can be represented graphically or in terms of a numerical tabulation. In fact, however, it has not heretofore been possible to produce a compound-curved surface of any substantial complexity with an automatically controlled tool. So-called five-axis machines have been proposed, wherein the rotary cutting or grinding tool is servo positioned to change the orientation of its rotational axis as necessary to maintain said axis at all times normal to the desired surface. But even with such a machine, which is very expensive, the problem of programming the necessary changes of orientation of the tool in coordination with the necessary feed movements remains unsolved in relation to the shaping of compound-curved surfaces that have any substantial complexity.

It seems safe to say, therefore, that it has not heretofore been known how to use a numerically controlled machine tool for the forming of compound-curved surfaces of any but the simplest forms.

The general object of the present invention is to provide a solution to this heretofore unsolved problem, and more particularly to provide a method of forming on a workpiece a surface having compound curvature, with the use of an automatic machine tool of the so-called 2½-axis type, wherein the rotation axis of the cutting or grinding tool maintains a fixed orientation.

Another object of this invention is to provide a method of programming the movements that must be made by the rotary cutting or grinding element of a numerically controlled machine tool during each working pass thereof to cause the tool to produce on a workpiece a surface having a predetermined contour of compound curvature.

With these observations and objectives in mind, the manner in which the invention achieves its purpose will be appreciated from the following description and the accompanying drawings, which exemplify the invention, it being understood that such changes in the precise method of practicing the invention disclosed herein may be made as come within the scope of the appended claims.

The accompanying drawings illustrate two complete examples of embodiments of the invention constructed according to the best modes so far devised for the practical application of the principles thereof, and in which:

FIG. 1 is a perspective view of an article to be produced by the method of this invention, having a surface with a desired compound curvature;

FIG. 2 is a perspective view of a workpiece from which the article shown in FIG. 1 is to be produced, illustrating an early stage in the practice of the method of this invention;

FIG. 4 is a fragmentary perspective view illustrating substantially the same phase in the practice of the method as is covered by FIG. 3;

Figure 3:
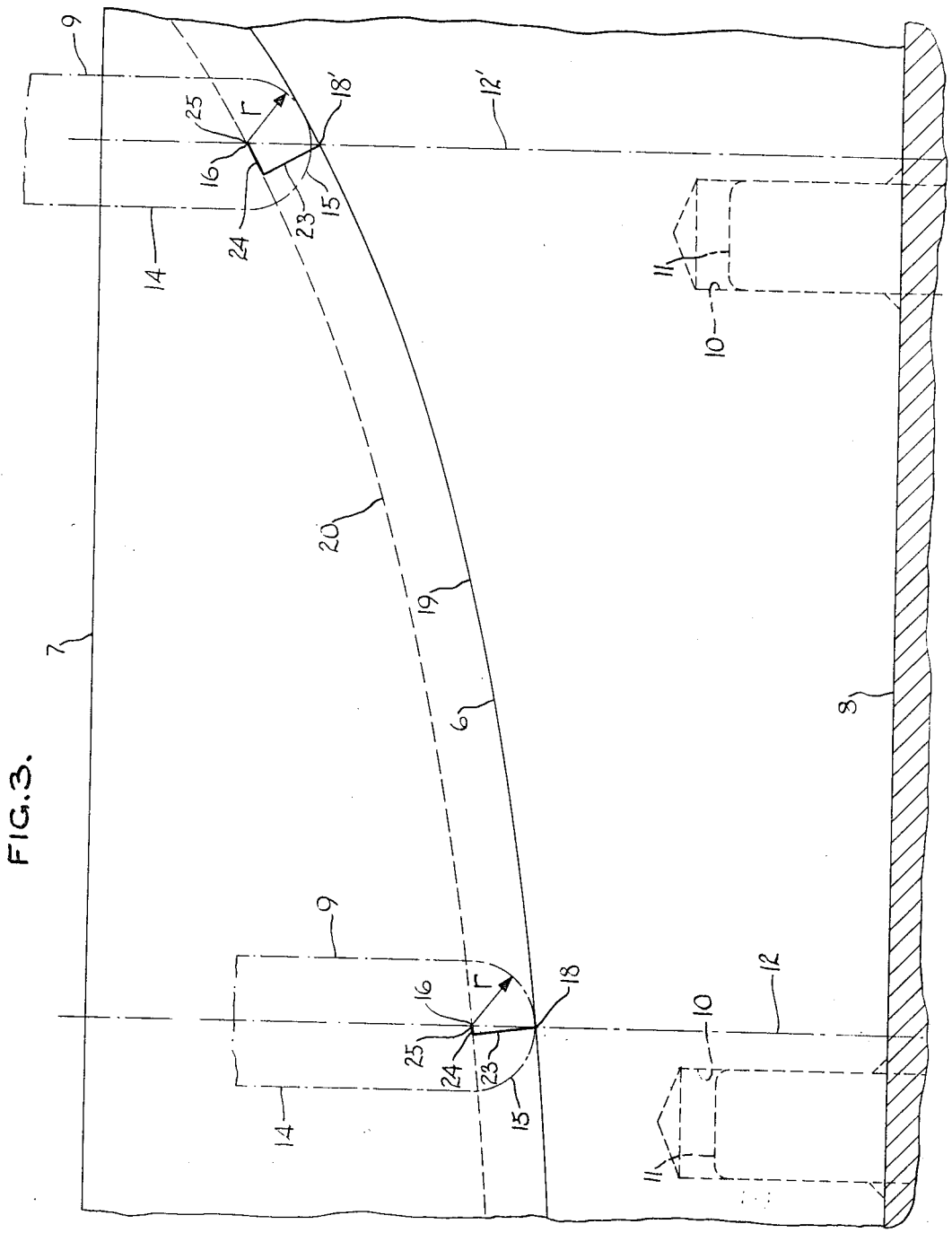
FIG. 3 is a longitudinal sectional view, on an enlarged scale, of the workpiece shown in FIG. 2, illustrating another stage of the method.

Referring now to the accompanying drawings, the numeral 5 designates a finished article which is to have a surface 6 of a predetermined contour and which is to be produced from a solid blocklike workpiece 7. The surface is not a surface of revolution, so that it does not lend itself to formation by means of a lathe or a similar tool on which the workpiece is rotated. However, the desired shape or contour of the surface 6 is definable in terms of a mathematical expression or expressions, or graphically, or in the form of a tabulation of numerical values, or in the form of a scale model.

If the desired surface is defined in the form of a scale model, for example, then as a preliminary step in the practice of the invention, that surface must be redefined in numerical terms either as a mathematical expression or expressions or as a table of point coordinate values or the like. One method of numerically describing such a surface is disclosed in the article "Modern Aircraft Geometry," by N. Lidbro, in Aircraft Engineering for Nov. 1956, p. 388.

Given a definition of the shape of the desired curved surface and specified requirements for the finished article, such as tolerances, surface finish etc., the most suitable manufacturing method is decided upon, that is, whether the shaping is to be accomplished by a cutting operation or by grinding; the dimensions of the unshaped workpiece are determined; and selection is made of a tool or tools for doing the actual shaping.

In the following description of the method of this invention is explained with reference to shaping of a workpiece 7 by means of a machine having a work supporting table 8 and having a rotating work performing tool 9, such as a cutter or a grinder, the axis of which always maintains the same orientation. The machine is arranged for effecting three modes of relative motion between the tool 9 and the table 8, one of said modes, designated by Z in FIG. 2, being motion in opposite directions parallel to the axis of rotation of the tool, the second, designated by Y, being transverse motion in opposite directions perpendicular to the tool axis, and the third, designated by X, being longitudinal motion in opposite directions. It will be apparent that one of said modes of motion could be a feeding rotation of the workpiece about a fixed axis, the other two then being in directions respectively transverse and parallel to said axis; but for simplicity it will be assumed herein that the motions are along conventional rectangular coordinate axes, one of which is parallel to the rotational axis of the tool.

To further simplify the explanation it will be assumed that the tool 9 moves and that the table 8 remains stationary, although the reverse is usually the case with an actual machine. On the basis of this simplification it can be said that the tool is movable in two of its modes of motion (Z and Y) during each working pass, and that the tool is moved in the third (X) mode when it is indexed between working passes. These tool motions are governed by numerical control means which can be of any well-known type and which are therefore not shown.

It will be understood that the workpiece 7, while shown as a parallelepiped substantially larger in all dimensions than the desired finished product, need only be of such size and shape that the finished product can be sculptured out of it with an adequate working margin.

The workpiece is releasably secured to the table 8 in immovable relation thereto. For this purpose the workpiece is shown as having wells or blind bores 10 that extend upwardly into it from its underside, in which are received closely fitting pins or studs 11 that project upwardly from the table.

A series of parallel cut path planes 12, 12' through the workpiece are next defined. These extend in the directions Y, Z defined by the cutting modes of motion of the tool and are spaced from one another in the direction X of indexing motion. Preferably the cut path planes are spaced apart so that the space between adjacent planes is adapted to the inclination of the surface normal to the Y-Z-plane to give the produced surface a prescribed smoothness. Each of the planes thus selected defines the feed path of a cut or working pass that will be made by the tool 9, and as the tool moves in its two modes of working pass motion during the making of that cut, a hereinafter described center in the tool will be confined to that plane. Hence the spacing of said planes is selected, in general, with regard to the contour of the work-engaging surface of the tool and the tolerance limits prescribed for the accuracy of the surface to be formed. For clarity and simplicity only two such cut path planes have been shown, spaced apart by a distance substantially greater than would be employed for the spacing of the planes in the actual practice of the method.

Along each of the cut path planes 12, 12' the desired finished surface can be defined by a profile line along which the plane intersects the desired surface. This profile or intersection line for the plane 12 is designated 13, the one for the plane 12' is designated 13'. Naturally the intersection lines can be defined by spaced-apart points 17 on them, the spacings between adjacent points being varied along each intersection line in accordance with the amount of curvature of the line in the neighborhood of the points.

As the tool moves in a cut along each cut path plane, the bottom of the cut that is made by the tool will correspond with points on the desired finished surface all along the length of the cut. However, because the axis of the tool maintains a constant orientation, rather than tilting to remain at all times normal to the desired surface, the line along the bottom of the cut that coincides with the desired surface will not necessarily fall on the cut path plane along which the cut is made. To explain this more fully, further consideration must be given to the shape of the tool, with reference first to FIG. 3.

The work performing tool shown in FIG. 3 is a milling cutter having a cylindrical upper portion 14 that is helically fluted in the manner of a twist drill, to provide for chip emission, and having at its bottom a hemispherical work-engaging surface 15. The radius r of the hemispherical work-engaging surface is equal to the radius of the cylindrical upper portion; and the center 16 of the hemispherical work-engaging surface coincides with the rotational axis of the tool, which is also, of course, the axis of its cylindrical portion.

FIG. 3 is a vertical section through the workpiece taken in the direction X of tool indexing, transversely to the planes 12 and 12'. The line 19 denotes the profile of the desired surface on the plane of FIG. 3 and hence the line 19 coincides with the profile line 13 at the point 18 on cut path plane 12 and coincides with profile line 13' at the point 18' on cut path plane 12'. In the particular case illustrated in FIG. 3, one of the modes of working pass motion of the tool is motion in directions parallel to its rotational axis, so that said axis as well as the tool center 16 coincide with each cut path plane as the tool moves therealong during its cutting stroke.

Considering the cut made by the tool as it moves along the cut path plane 12', it will be observed that as the tool crosses the plane of FIG. 3 the cut that it makes must be spaced above the point 18' on the path plane 12', but its cut does coincide with the desired surface, as defined by the line 19, at a point slightly to the right of the plane 12'. It will thus be apparent that if the tool were caused to cut all the way down to the intersection line 13' along the plane 12', the right-hand portion of its working surface would cut too far into the workpiece, penetrating below the desired surface.

The problem, then, is to so control the tool that its cut along each cut path plane will carry some part of the work-engaging surface of the tool just into tangency to the desired surface, with such tangency occurring all along the cut, so that even though the desired surface is not necessarily defined on the particular cut path plane of the cut, it is defined along a line in the cut that is continuous all along the cut. When this is achieved, successive such cuts cooperate to define the desired surface accurately, in that a filing, grinding or similar manual or semiautomatic operation that takes off the wave-shaped ridges between cuts, down to the bottoms of the several cuts, will finish form the desired surface.

The condition to be satisfied for the solution of the problem stated above is that the center 16 in the tool shall at all times coincide with a reference surface 20 which can be loosely described as parallel to the desired surface, outside the same, and spaced from it by a distance equal to r. More accurately, the reference surface is an imaginary one (it could be termed a phantom surface) which lies at the distance r outwardly from the desired surface along normals to the desired surface at every point thereon.

Of course not every point on the reference surface need be determined, but, instead, it is sufficient to define the reference surface in terms of the locus lines 21 along which it intersects the cut path planes. Furthermore, only spaced points need be taken along each such locus line, the points thus selected corresponding to the selected points, such as 17, that define the desired surface profile line therebeneath on the same cut path plane.

There are various ways of determining the locations of the needed points on the reference surface.

One procedure, illustrated in FIG. 3, is to determine a line 23 that is normal to the desired surface at each of the points, such as 17, that define said surface; and then, at a distance r along that line from the desired surface, establish another line 24 which is normal to the line 23 and which intersects the adjacent cut path plane. The point 25 at which the last-mentioned line 24 intersects the cut path plane lies on the reference surface, or so nearly so as to be within limits of tolerance that would normally be specified. As illustrated in FIG. 3, the normals 23 and 24 can be plotted graphically from each of the desired surface defining points such as 17, having due regard to both of the directions of inclination of the desired surface at each of the defining points (that is, inclination of the desired surface transversely to the plane of the paper as well as in it); or the locations of the reference surface defining points such as 25 can be calculated by well-known trigonometric formulas.

The inaccuracy of the method just described tends to exceed tolerable limits only for points where the radius r of the cutter is substantially equal to or less than the radius of curvature of the desired surface and the plane of the desired surface departs substantially from a right-angle relationship to the cut path plane.

Figure 5:
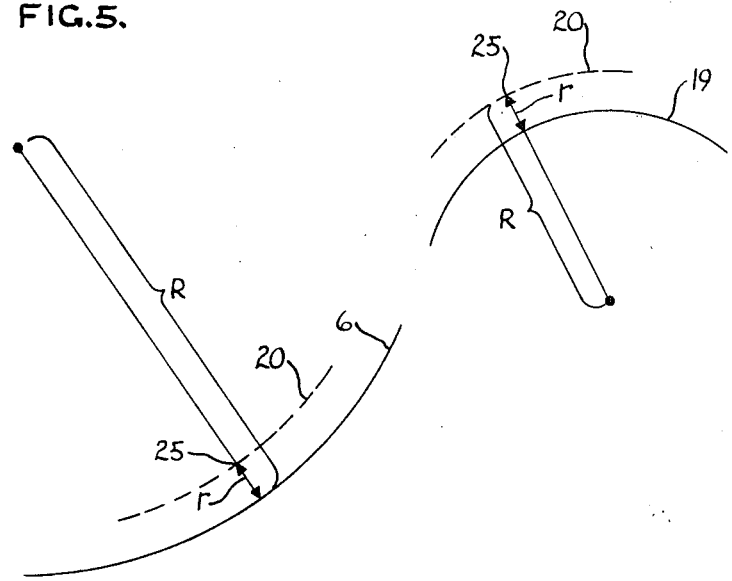
FIG. 5 is a view generally corresponding to FIG. 3 but illustrating a modification of the method.
Figure 6:
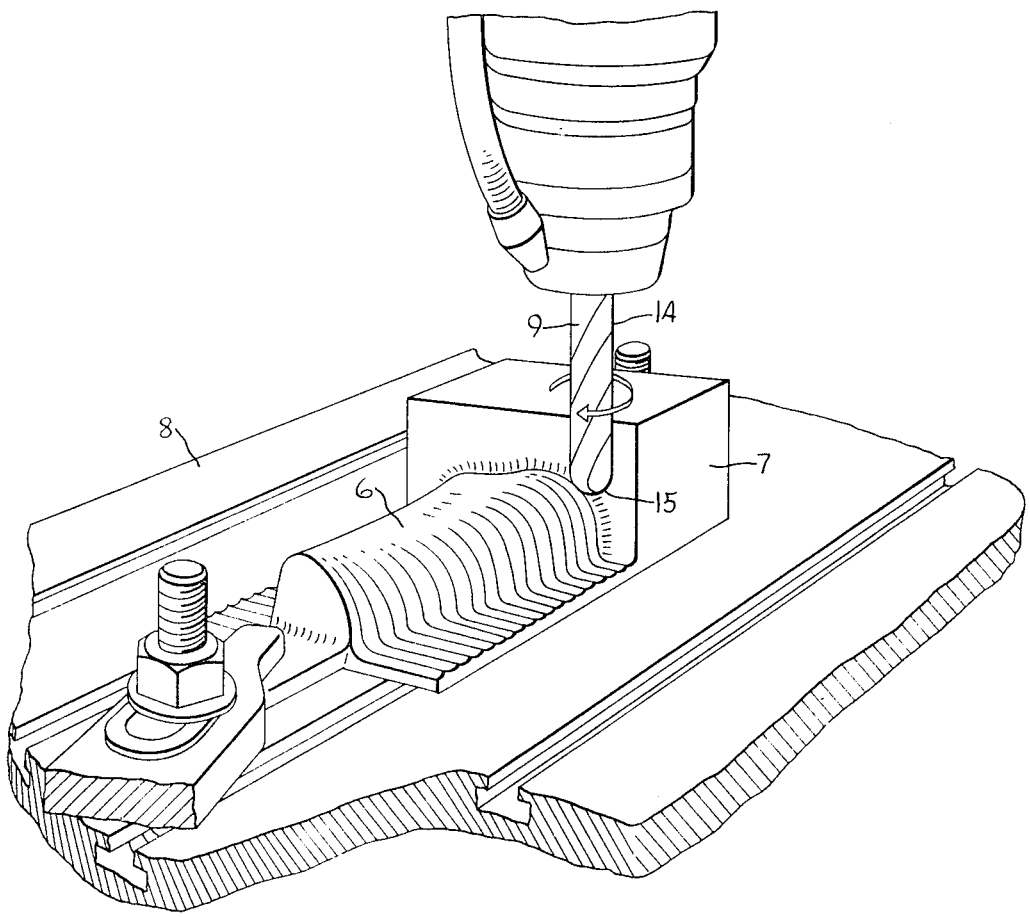
FIG. 6 is a perspective view illustrating a stage in the machining of the desired surface on the workpiece in the practice of the invention.

A more accurate approximation of each point such as 25 on the reference surface can be obtained, as illustrated in FIG. 5, by calculating for each defining point such as 17 on the desired surface, the radius of curvature R of the desired surface at that point and the center of its curvature, and then calculating a circle from the same center and which is thus concentric to the curvature of the desired surface, but which circle has a radius that differs by r from the radius R of the desired surface. If the desired surface is concave at the point in question, the radius of the circle is $R-r$; if convex, it is $R+r$. The point at which the circle thus calculated intersects the adjacent cut path plane lies on, or very nearly on, the reference surface.

While the last-described procedure can be performed by calculations, it can also be performed graphically, as illustrated in FIG. 5.

As a third alternative, the cut path planes can be selected in relation to the reference surface after the latter is defined. In this case the desired surface can be defined in terms of a set of points, suitably expressed, and the reference surface can be defined by a second set of points, established by taking normals to the desired surface at the defining points thereon and measuring (or calculating) outwardly along each such normal by a distance equal to $r$. With the reference surface completely defined, the cut path planes can be established relative to it, and the points on the cut path planes which define the locus of the cutting tool center 16 can then be established by reference to the definitions of the reference surface and the cut path planes, to the extent that the cut path planes have not been selected to coincide with already defined points on the reference surface.

After a sufficient number of reference surface points for each cut path plane have been established by one of the above-described procedures, such points will define a line or locus along which the tool center 16 must be moved in the course of the cut along the plane. Data concerning the Y and Z coordinates of these points is then transcribed onto an information carrier (not shown), such as a punched tape or magnetic tape, along with other conventional data needed for control of the automatic machine, such as feed speed, tool indexing data and the like. The path of the tool during each working pass preferably consists of a number of circular arcs and/or straight lines, connected to form a continuous curve, and where the path comprises arcs, consecutive arcs along the path should preferably be tangential to one another at their points of connection. The manner of generating a control input from the point defining data, to cause the tool to move in its desired path during each working pass, is known; and for each particular machine system this depends upon the numerical control language (e.g., APT) that is to be employed.

With respect to articles that cannot be machined in closed paths, such as those shown, the machine is preferably programmed so that it first cuts in one direction across the workpiece, along one cut path plane, then indexes to the next cut path plane and makes its next working pass back across the workpiece in the opposite direction, thus eliminating the need for returning the tool idle across the workpiece for each successive working pass.

Particularly for workpieces having a large excess of material to be removed, it is advantageous first to make an automatic roughing cut. This can be accomplished generally in the same manner as the actual forming operation, moving the tool along the same cut paths, or a smaller number of them, as for example every other one. The tool for the roughing cut should have a work-engaging surface that is of the same shape as the one used for the actual forming operation, but it should have smaller diameter and radius $r$.

Owing to the shape of the desired finished part illustrated in FIG. 1, it is possible to machine it by means of a tool or cutter such as that described above, having a cylindrical upper portion and having at its bottom a hemispherical cutting or grinding surface which is of the same radius as the upper portion and concentric with it. However, for forming a surface having an overhang, such as that illustrated in FIG. 7, it is necessary to use a tool with a convex work-engaging surface at its bottom that extends radially outwardly of the upper portion of the tool. Thus the bottom portion of the tool could be generally spherical and concentric with the rotational axis of the tool but have a substantially larger radius than its upper shank portion; but in that case the tool might not be well adapted to the production of surfaces having small radius curvatures.

Figure 7:
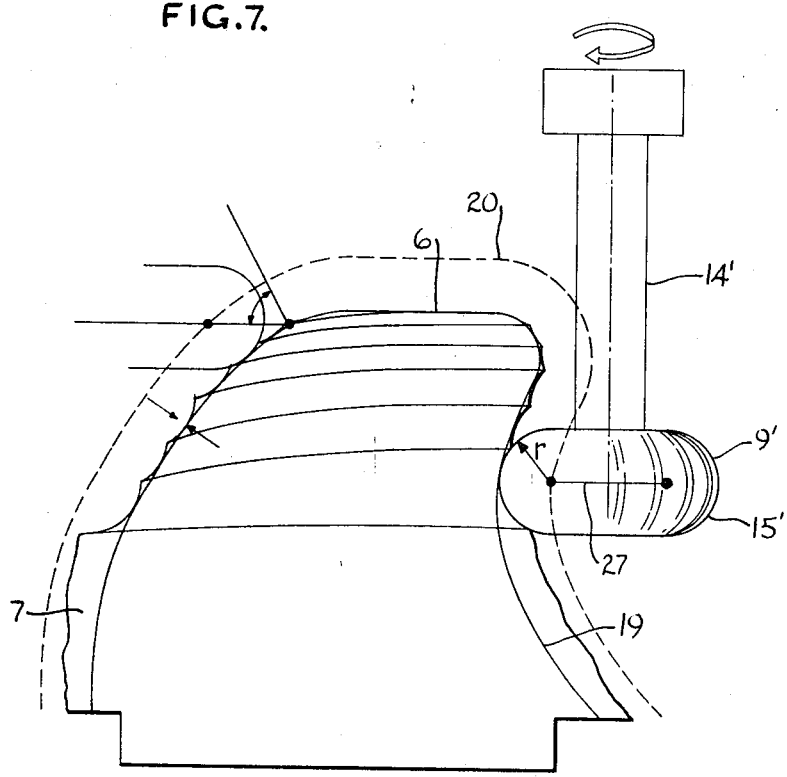
FIG. 7 is an end view of a workpiece on which a surface of a different compound curvature is being machined in the practice of the method of this invention.

A tool suitable for production of the article surface illustrated in FIG. 7 is designated by 9' in that figure. The upper portion of the tool 9' is a generally cylindrical shank 14', and its lower portion, which comprises its work-engaging cutting or grinding surface 15', is toroidal and of a substantially larger diameter. Thus the work-engaging surface 15' has a convexly semicircular profile as viewed from one side of the tool axis, and the center of its profile curvature lies on a ring 27 which coincides with the equatorial plane of the toroid and is concentric with the tool axis.

With the tool just described, the tool center that is caused to move on the reference surface during each working pass is that point on the ring 27 which is nearest the desired surface. The method of defining the reference surface is the same as that previously described.

In the case of the workpiece shown in FIG. 7, the cut path planes are spaced apart at smaller distances near the top of the article than at its bottom, inasmuch as the desired surface departs more from a right-angle relationship to those planes on that part of the article. In this way the height of the wavelike ridges between cuts can be minimized, reducing the amount of manual or semiautomatic finishing work that must be done on the article after the numerically controlled machining operation is completed. In this connection it is to be observed that, in general, the amount of excess material left between cuts at the conclusion of the numerically controlled machining operation is decreased with increasing radius $r$ of the work-engaging surface of the tool and with decreasing distance between cut path planes.

From the foregoing description taken with the accompanying drawings it will be apparent that this invention provides a method of programming a numerically controlled machine tool for causing it to accurately produce on a workpiece a desired surface configuration having compound curvature.

Those skilled in the art will appreciate that the invention can be embodied in forms other than as herein disclosed for purposes of illustration.

The invention is defined by the following claims:

1. The method of shaping a workpiece to a desired surface of compound curvature without an existing physical model by means of a numerically controlled machine having a tool with at least two perpendicular axes of movement relative to the workpiece and which rotates about an axis that always has the same orientation and has a work-engaging surface so shaped that along any radial plane containing the tool axis said work-engaging surface is a convexly circular arc, said circular arc being, in all of said planes, of uniform radius about a center which is in the same relation to the tool axis, said method being characterized by:

so programming said numerically controlled machine that with the work-engaging surface of the tool engaged with the workpiece, the following relative motion between the tool and the workpiece occurs A. said axis about which the tool rotates moves relative to the workpiece in each of a succession of parallel, spaced-apart planes through the workpiece; and B. said center at all times coincides with a reference surface which is 1. spaced outwardly from the desired surface, and 2. which is defined by the intersection of a normal to the desired surface with the plane in which said axis is moving at a distance from the desired surface that is equal to said radius.

2. The method of shaping a workpiece to a desired surface of compound curvature without an existing physical model by means of a machine having a tool which rotates about an axis that always has the same orientation and which has a work-engaging surface so shaped that along any radial plane containing the tool axis said work-engaging surface is a convexly circular arc, said circular arc being, in all of said planes, of uniform radius about a center which is in the same relation to the tool axis, said method being characterized by:

so programming said numerically controlled machine that while the tool moves with its work-engaging surface engaged with the workpiece said center at all times coincides with a reference surface which is 1. spaced outwardly of the desired surface, and 2. which is at a distance from the desired surface, as measured on normals thereto, that is equal to said radius.

3. The method of claim 4, further characterized by the step of:
performing a roughing operation prior to shaping the surface with said tool, which roughing operation is characterized by
1. the use of a roughing tool similar to the tool used for shaping said surface but having the radius of its convexly semicircular surface smaller than that of the first-mentioned tool, and
2. moving said roughing tool in substantially the same pattern of cutting motion as the first-mentioned tool, including so controlling its relative motion of said two modes as to cause its said center, during each working pass, to coincide with each of said points lying on the plane with which its said center then coincides.

* * * * *

UNITED STATES PATENT OFFICE
CERTIFICATE OF CORRECTION

Patent No. 3,641,872          Dated February 15, 1972

Inventor(s) Christer Ulfhielm

It is certified that error appears in the above-identified patent and that said Letters Patent are hereby corrected as shown below:

Column 2, line 21: "The surface" should read --The surface 6--
Claim 2, column 6, line 62: insert --numerically controlled-- before "machine"
Claim 2, column 6, line 62: after "tool" insert --with at least two perpendicular axes of movement relative to the work piece and--
Claim 2, column 6, line 63: delete "which" after "and"
Claim 3, column 7, line 1: "claim 4" should read --claim 1--

Signed and sealed this 1st day of August 1972.

(SEAL)
Attest:

EDWARD M. FLETCHER, JR.      ROBERT GOTTSCHALK
Attesting Officer              Commissioner of Patents